US008306778B2

(12) United States Patent
Leao et al.

(10) Patent No.: US 8,306,778 B2
(45) Date of Patent: Nov. 6, 2012

(54) PROGNOSTICS AND HEALTH MONITORING FOR ELECTRO-MECHANICAL SYSTEMS AND COMPONENTS

(75) Inventors: Bruno Paes Leao, Sao Jose dos Campos (BR); Joao Paulo Pordeus Gomes, Sao Jose dos Compos (BR)

(73) Assignee: Embraer S.A., Sao Jose dos Campos - SP (BR)

( * ) Notice: Subject to any disclaimer, the term of this patent is extended or adjusted under 35 U.S.C. 154(b) by 384 days.

(21) Appl. No.: 12/636,392

(22) Filed: Dec. 11, 2009

(65) Prior Publication Data
US 2010/0161274 A1    Jun. 24, 2010

Related U.S. Application Data

(60) Provisional application No. 61/140,302, filed on Dec. 23, 2008.

(51) Int. Cl.
*G06F 17/18* (2006.01)
*G06F 15/00* (2006.01)
*G08B 21/00* (2006.01)
*G06F 19/00* (2006.01)

(52) U.S. Cl. ......... 702/179; 701/123; 702/144; 714/25; 714/26

(58) Field of Classification Search ........... 702/144, 702/179; 701/123; 714/25, 26
See application file for complete search history.

(56) References Cited

U.S. PATENT DOCUMENTS

| | | | |
|---|---|---|---|
| 5,442,562 A | | 8/1995 | Hopkins et al. |
| 5,545,007 A | * | 8/1996 | Martin ....................... 415/173.2 |
| 7,096,074 B2 | * | 8/2006 | Yulevitch et al. ............... 700/21 |
| 7,925,464 B1 | * | 4/2011 | Bazemore ..................... 702/119 |
| 2002/0040278 A1 | * | 4/2002 | Anuzis et al. .................. 702/56 |
| 2003/0080256 A1 | * | 5/2003 | Urnes et al. ................... 244/194 |
| 2004/0249520 A1 | * | 12/2004 | Maine .............................. 701/3 |
| 2006/0000507 A1 | * | 1/2006 | Rodriguez et al. ......... 137/15.18 |
| 2006/0195248 A1 | * | 8/2006 | Kim et al. ..................... 701/100 |
| 2007/0124113 A1 | * | 5/2007 | Foslien et al. ................ 702/185 |
| 2008/0154823 A1 | * | 6/2008 | Volponi et al. ................. 706/45 |
| 2008/0276712 A1 | * | 11/2008 | Kurtz et al. .................... 73/715 |
| 2009/0082919 A1 | * | 3/2009 | Hershey et al. ................ 701/35 |

OTHER PUBLICATIONS

P. C. Mahalanobis, "On the generalized distance in statistics," Proceedings of the National Institute of Science of India, vol. II-No. 1, 12,49-55, Calcutta, India (Apr. 15, 1936).
H. Hotelling, "Analysis of a complex of statistical variables into principal components," Journal of Educational Psychology, 24,498-520 (1933).
G. C. Runger, "Projections and the U2 Multivariate Control Chart," Journal of Quality Technology, vol. 28, No. 3, 313-319 (Jul. 1996).
T. Kourti and J. F. Macgregor, "Process analysis, monitoring and diagnosis, using multivariate projection methods," Chemometrics and Intelligent Laboratory Systems 28,3-21 (1995).

* cited by examiner

*Primary Examiner* — Sujoy Kundu
*Assistant Examiner* — Haidong Zhang
(74) *Attorney, Agent, or Firm* — Nixon & Vanderhye P.C.

(57) ABSTRACT

A method and system for monitoring and predicting the health of electro-mechanical systems and components includes collecting data for a fixed pattern of actuation of such system or component. This data is used to build statistical models that correspond to a normal state of the system or component. New measurements are compared to this model in order to monitor the health of the system or component. The comparison can be made using a distance calculation. The combination of new measurements with historical data provides the prediction for future health states of the system or component.

73 Claims, 11 Drawing Sheets

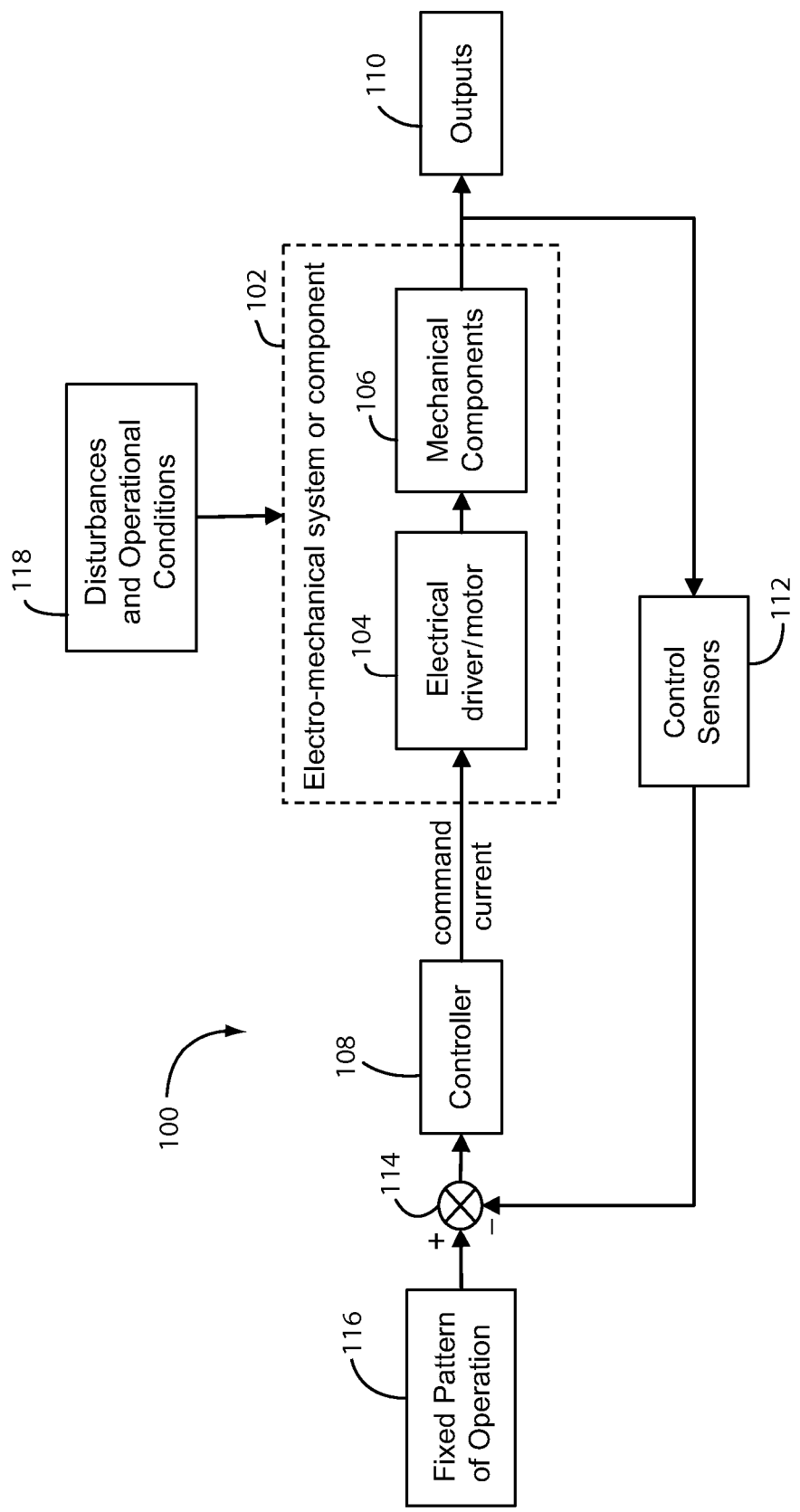

PROGNOSTICS AND HEALTH MONITORING FOR ELECTRO-MECHANICAL SYSTEMS AND COMPONENTS

CROSS-REFERENCES TO RELATED APPLICATIONS

This application claims the benefit of priority from provisional application No. 61/140,302 filed Dec. 23, 2008, the contents of which are incorporated herein by reference. This application is related to commonly assigned copending U.S. patent application Ser. No. 12/635743 filed Dec. 11, 2009 entitled "Performance Monitoring And Prognostics For Aircraft Pneumatic Control Valves".

STATEMENT REGARDING FEDERALLY SPONSORED RESEARCH OR DEVELOPMENT

Field

This technology relates to automatic testing and failure prediction, and more particularly to estimating current and future health states of electromechanical components and/or systems. Still more particularly, the technology relates to improved methods, systems and techniques for monitoring the health of a closed-loop electromechanical system onboard an aircraft or in other industrial applications.

BACKGROUND AND SUMMARY

Many or most modern industrial and vehicular applications use closed-loop electromechanical components and/or systems. Electromechanical actuators ("EMA") may be used for positioning a platform of an industrial plant, in robotics contexts, or for any of a wide variety of applications. On board vehicles such as aircraft, it is common for electromechanical actuators to be used to position control surfaces (e.g., for aircraft flight control) and for many other purposes.

Just like any other moving part, electromechanical systems and components degrade during their useful life and eventually wear out. Degradation of mechanical and electromechanical parts can result in increased friction, lower efficiency and eventually, malfunction.

Statistical process control (SPC) and multivariate statistical process control (MSPC) and other statistical methods have been used to monitor electromechanical components in chemical and manufacturing process plants. For example, it is known to use multivariate statistical process control for monitoring a manufacturing process. Non-linear statistical techniques can be used to provide early warning of abnormal situations.

It is generally known to monitor the health of actuators in mechanical and electromechanical systems in order to predict failures and system degradation. For example, it is known to use a model-based method for monitoring the mechanical components of a manufacturing process. Degradation of mechanical sub-systems or components can lead to increased friction, loss of efficiency or other phenomena. Such degradation may build up to the point of causing a system or component jam or other failure.

When mechanical sub-systems or components are controlled in a closed loop control system, the controller is often able to compensate for some level of degradation. In such cases when the controller can compensate, no indication of the degradation can generally be obtained from the outputs of the system—in part because the controller has already compensated for the situation just as it was programmed to do. The controller increases or otherwise changes the command current or voltage in order to deal with the higher friction or other changing factor as the control system adapts automatically to the change in behavioral characteristics of the electromechanical system or component.

The monitoring of this command current or other variables related to the electrical input or control power may indicate abnormalities of electro-mechanical systems or components. Exemplary non-limiting implementations herein use command current or other measurements related to the electrical power or other control parameters to monitor system or component health. In cases where the degradation is more severe, the controller may not be able to compensate and guarantee the performance of the system or component. In this case, output variables of the system, such as positions or speeds, may provide indications of the degradation. The exemplary illustrative non-limiting implementation may also use position or speed measurements to monitor system or component health.

Many systems that are already developed today were not designed to provide ideal information for heath monitoring purposes. In many cases, useful signals may be mixed with others, making useful signal acquisition more difficult. The development of health monitoring systems using these inadequate information is a major challenge.

Blind source separation is a set of statistical techniques that has been used in many different applications for separating independent signals. One of these techniques is called Independent Components Analysis ("ICA"). A major goal of ICA is to separate independent signals that generated a set of combined signals. For example, suppose you are in a room where two people are talking simultaneously and two microphones are recording both voices at different positions in the room. Using ICA, it is possible to extract the voices of the two people separately just using two recordings of both talking at the same time. In industrial applications, it is possible to use ICA to separate influences of different signals in a set of given measurements.

Operational conditions and disturbances which are not related to the system or component degradation may yield increments of the command currents (electrical power) or otherwise change controller output parameters. For reliable monitoring, such operational conditions and disturbances can also be monitored and taken into account. The exemplary illustrative non-limiting implementation may use operational conditions and disturbances measurements as part of an analysis to monitor system or component health.

One exemplary illustrative non-limiting implementation herein uses analytical techniques to process data obtained from sensors that measure quantities related to electromechanical system or component actuation. Such quantities can include, for example, position, speed, command current, command power, or other measurable parameters. Sensors may be used to measure quantities related to the operational conditions of such electromechanical system or component actuation, including but not limited to for example the weight of a platform, the dynamic pressure acting upon an aircraft control surface, or other parameters.

In one exemplary illustrative non-limiting implementation, a method of monitoring the health state of an electromechanical system or component controlled in a closed loop fashion may include collecting a group of measurements of at least one measurable varying parameter from healthy instances of said system or component while it is being commanded for a known pattern of operation under various normal operational conditions. Such collected measurements may be used to construct a statistical model. New measurements collected from the same measurable varying parameters for at least one instance of the system or component can be compared with the statistical model to produce an index of quantitative degradation. An indication may be generated upon detection of an abnormal situation whenever the degradation exceeds an alarm threshold for example. Alternatively, this index can be combined with historical data and this information can be used to predict future health states of the system or component.

In exemplary illustrative non-limiting implementations, measurements can include for example electrical input power, electrical command current to motors, position indicators, speed indication, operational conditions, disturbances or other measurable information.

The predetermined pattern of operation can be a fixed pattern that is the consequence of normal operation. It could also be a pattern based upon testing operations.

The degradation index can be calculated using various calculations including but not limited to Mahalanobis distance, Hotelling's T2, Runger U2, multi-way PCA and/or other analysis.

In one particular exemplary illustrative non-limiting implementation, said electro-mechanical system could be an aircraft flap, slat or other aircraft control surface or actuator.

BRIEF DESCRIPTION OF THE DRAWINGS

These and other features and advantages will be better and more completely understood by referring to the following detailed description of exemplary non-limiting illustrative implementations in conjunction with the drawings of which:

FIG. 1 is a block schematic diagram of an exemplary illustrative non-limiting electromechanical system or component closed loop control system;

DETAILED DESCRIPTION

Example Control System Architecture

Figure 2A:
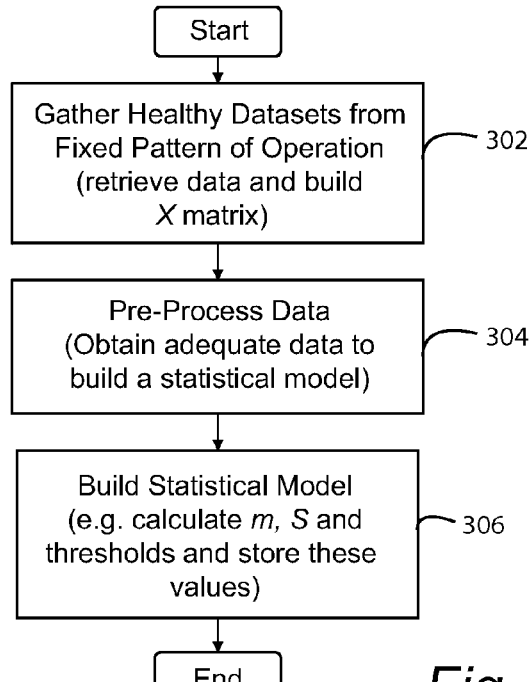
FIG. 2A is a flowchart of an exemplary illustrative non-limiting process for constructing a statistical model from healthy system or component data.

FIG. 1 shows an exemplary illustrative non-limiting closed loop electromechanical system or component is controlled in a closed loop form 100. The FIG. 1 includes an electromechanical system or component 102 which may comprise an electrical driver/motor 104 and associated mechanical component(s) 106. This system or component 102 generates outputs 110 that at least in part act in some type of process such as for example an aircraft control surface, an industrial process or the like. A controller 108 (e.g., a digital controller comprising a microprocessor or an analog circuit) generates a command current, voltage or other control signal to control the electromechanical system or component 102. The output of the electromechanical system or component 110 is monitored by a control sensor(s) 112 which provides feedback to controller 108. As well known to those skilled in the art, the resulting closed loop control system operates in accordance with a control rule, law or algorithm to dynamically compensate the operation of electromechanical system or component 102 for disturbances or other operation conditions 118 and take said electro-mechanical system or component to follow a certain pattern of operation 116. Other sensors that are not presented in the figure may also be present for monitoring purposes, such as an electrical current sensor for the electrical input of the system.

Figure 3:
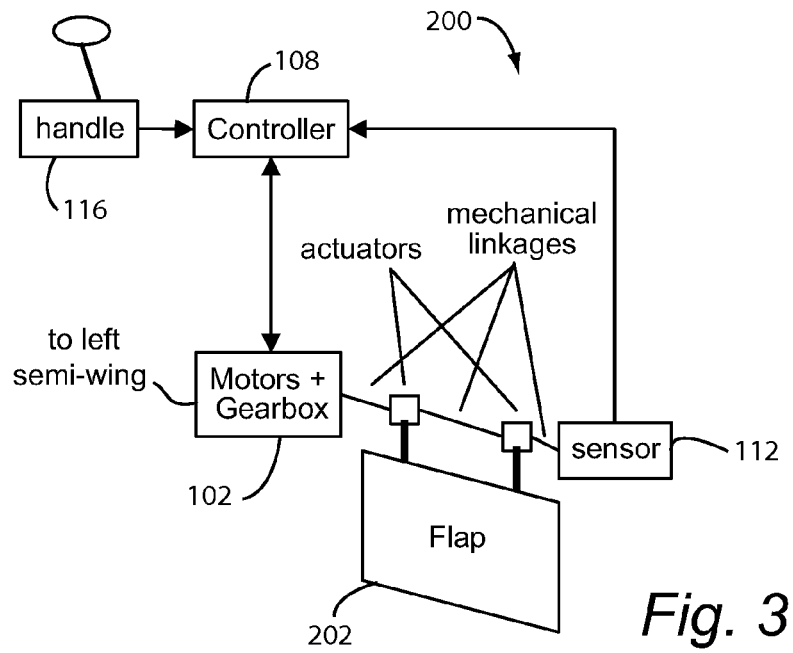
FIG. 3 schematically illustrates an exemplary illustrative non-limiting flap system or other control surface onboard an aircraft.

Aircraft flaps and slats systems are often closed loop electro-mechanical systems. See for example FIG. 3 showing an exemplary illustrative more detailed non-limiting aircraft flap system 200. In this example, the electromechanical system or component 102 defines the position of a flap or other airflow control surface through mechanical linkages and actuators. Sensors 112, which may monitor flap position, speed or other parameters, provide feedback to the controller 108, which controls electromechanical system or component 102 in response to the position of a control handle 116 (e.g., operated by a pilot). The preferred non-limiting embodiment consists of the application of this health monitoring method and system to aircraft flap or slat systems, such as the simplified flap architecture presented on FIG. 3. A slat system architecture is analogous to the flap system shown in FIG. 3 except that a slat is controlled instead of a flap.

The exemplary illustrative non-limiting FIG. 3 system works as follows: pilot/copilot moves the flap handle 116 to one of its discrete positions. This handle 116 provides the indication to the electronic controller 108, which in turn commands system electric motors 102 and verify position and speed feedback signals from system sensors 112. The torque is transmitted from the motors 102 to the actuators through a gearbox and mechanical linkages (usually torque tubes or flexible shafts). Actuators can be purely mechanical and transmit the rotary movement from the mechanical linkages to a linear movement of extension or retraction of the surface 202.

In the examples shown in FIGS. 1 and 3, control sensor(s) 112 provides feedback signals. This feedback is subtracted from a reference "fixed pattern of operation" 116 to provide an error indication to the controller 108. Many closed loop electro-mechanical systems or components are operated in a fixed or predetermined known (e.g., preprogrammed) pattern.

This fixed and/or otherwise predetermined known operational pattern may result from (a) usual operation of the system or component, and/or (b) usual testing or special testing dedicated to the collection of data for the assessment of system or component health.

Figure 4:
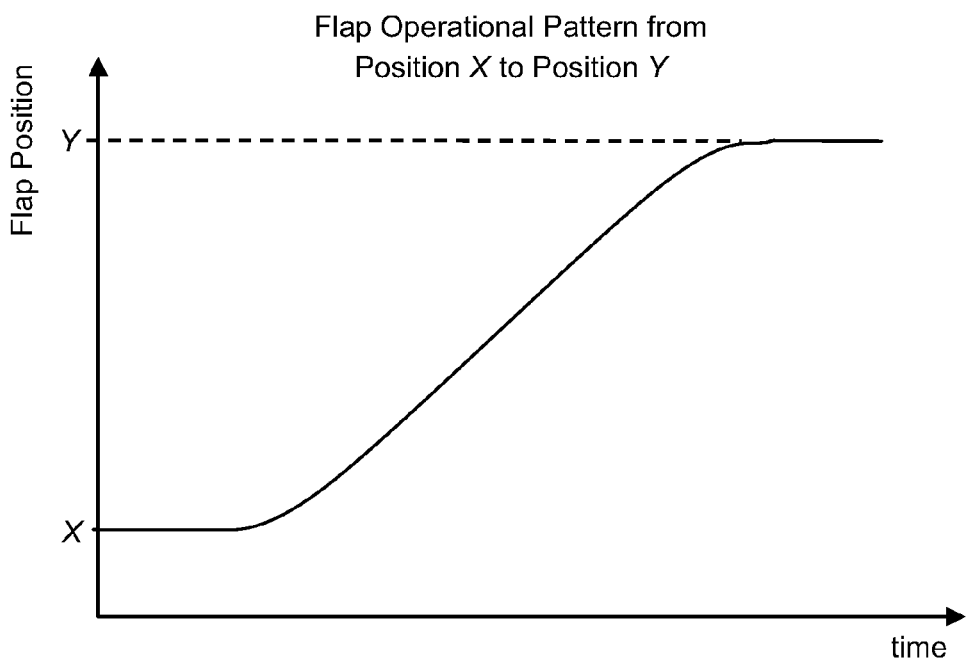
FIG. 4 graphically illustrates an exemplary illustrative non-limiting flap extension control operational pattern.

The FIG. 3 system is an example where usual operation occurs according to a fixed pattern. FIG. 4 presents an example of a fixed pattern for the extension of flap system 200 in response to operation of handle 116. A fixed operating pattern, such as that presented on FIG. 4, is used in the exemplary illustrative non-limiting implementation as a reference for the controller, which implements a closed loop control law to take the system to follow this reference. As can be seen, the fixed operational pattern from position X to position Y in this particular example provides a range of continuous flap position changes with time across a range of positions from position X to position Y. The fixed pattern causes flap 202 to move appropriately and continually across a range of useful travel in this particular example. It may prevent the flap 202 from moving too rapidly in order to minimize damage and/or for other reasons.

Example Illustrative Statistical Modeling

Figure 6:
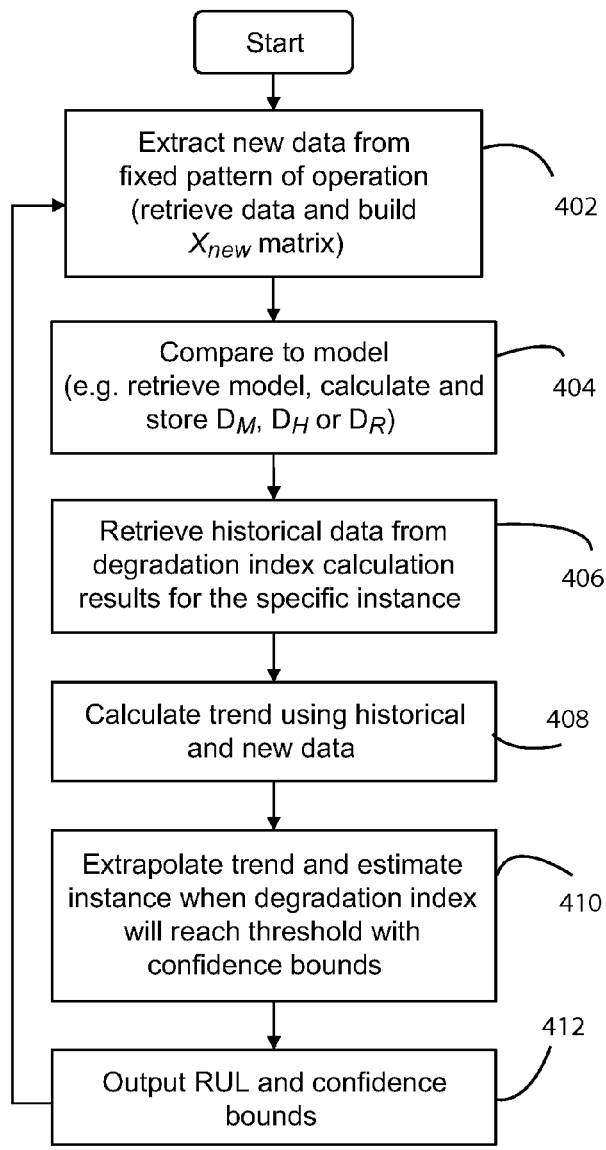
FIG. 6 is a flowchart of an exemplary illustrative non-limiting process for assessing degradation and performing prognostics.

The exemplary illustrative non-limiting implementation constructs a statistical model of system 100 or 200 using data gathered from the operation on such a fixed operational pattern. FIG. 2A shows an example algorithm for constructing a suitable model and FIGS. 2B and 2C and 6 show example algorithms for using the model.

The FIG. 2A presents an exemplary illustrative non-limiting implementation of a process for constructing a model using data from normal electro-mechanical systems or components sensors and data from measurements related to operating conditions and disturbances. Such data is preferably collected when the electro-mechanical system or component is submitted or constrained to operate in accordance with a fixed or predetermined known pattern of operation (block 302) and when the system is known to be operating normally. As will be detailed below, the collected data can be used to construct an X matrix that can be used for subsequent processing. Data collected from healthy systems or components can be used to build statistical models of the normal system or component behavior (block 304). Such statistical models can have many characteristics; the ones discussed in more detail below provide various values (m, S and thresholds) that can be used to compare with data collected during other (e.g., abnormal) system operation to determine faults or potential faults.

Figure 2B:
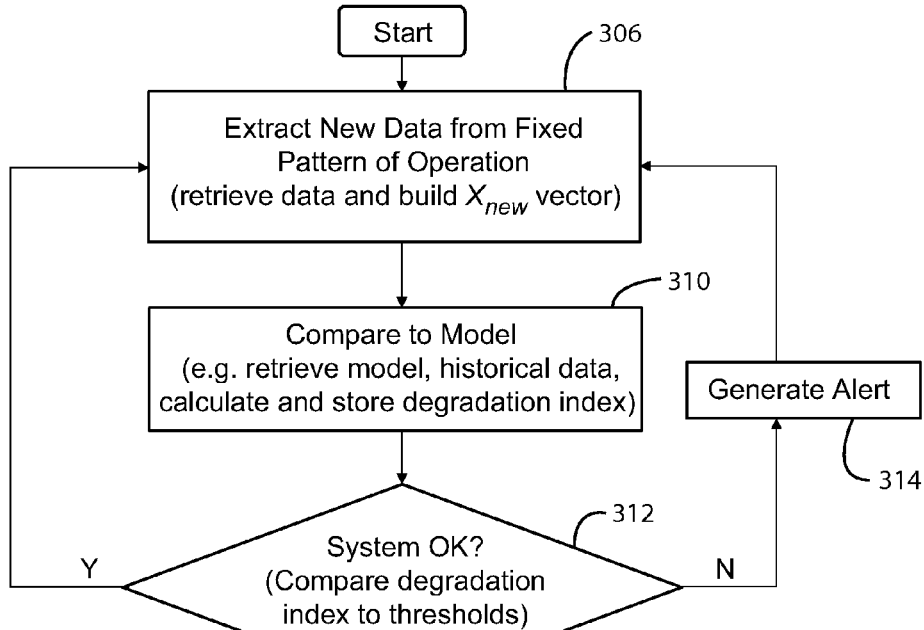
FIGS. 2B and 2C are flowcharts of exemplary illustrative non-limiting processes for comparing measured data from a monitored component or system to a model constructed in accordance with FIG. 2A.
Figure 2C:
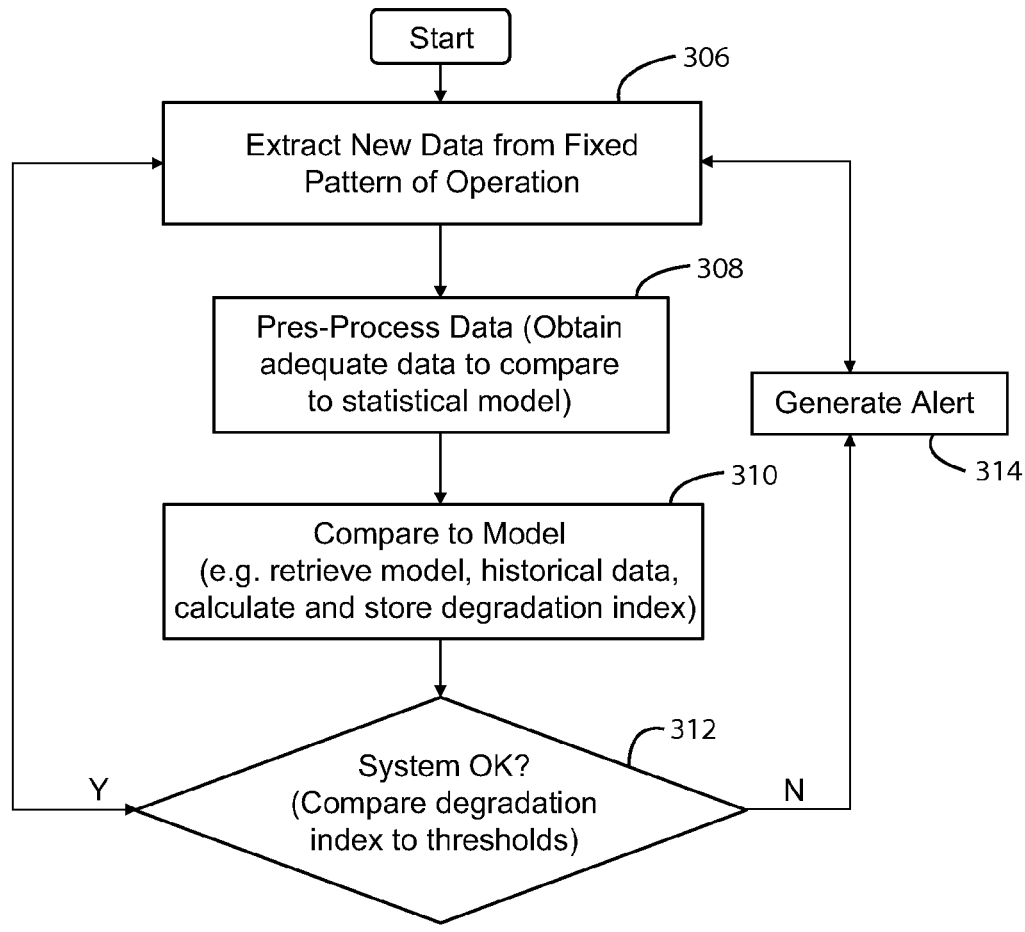

FIG. 2B shows how the model can be used to detect degradation or other faults or potential faults. New data is collected (e.g., in a determined frequency) for a system or component being monitored (block 306). This collected data is compared to the statistical model to determine if the monitored system or component is healthy or is degraded (block 310). If the system is determined not to be operating properly (block 312), action can be taken such as to generate an alert (block 314).

Legacy platforms may be designed without all sensors necessary for health monitoring or even with sensors that measure health monitoring variables summed with other variables provided by other systems. In cases like this, a pre-processing step may be used to extract adequate data to compare to the statistical model developed. FIG. 2C shows how the modeling phase presented in FIG. 2A and the monitoring phase presented in FIG. 2B can be adapted to include a pre-processing step 308.

Figure 10:
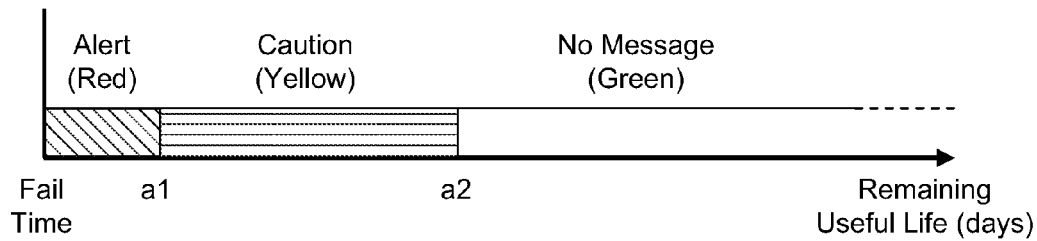
FIG. 10 shows an exemplary illustrative non-limiting degradation indicator of prognostics results.

FIG. 6 shows an alternative exemplary illustrative non-limiting implementation that also provides means for combining new measurements with historical data to yield the prediction for future health states of the system or component. As can be seen, blocks 402, 404 of FIG. 6 are similar to blocks 306, 310 respectively of FIG. 2B. However, in the FIG. 6 case, additional block 406 can retrieve historical data from degradation index calculation results for a specific instance, and a trend can be calculated using the historical and new data (block 408). The system can extrapolate trend and estimate instances when the degradation index will reach undesired thresholds (block 410), and an alert system can generate an output that can be graphically displayed as shown in the FIG. 10 exemplary illustrative presentations. The exemplary illustrative non-limiting alerting regions depicted are based on the "Remaining Useful Life" (RUL) as shown. As the RUL decreases, the displayed (bar) region goes from "No Messages" to "Caution" and "Alert".

Example Non-Limiting Details of Modeling Analysis

Figure 5A:
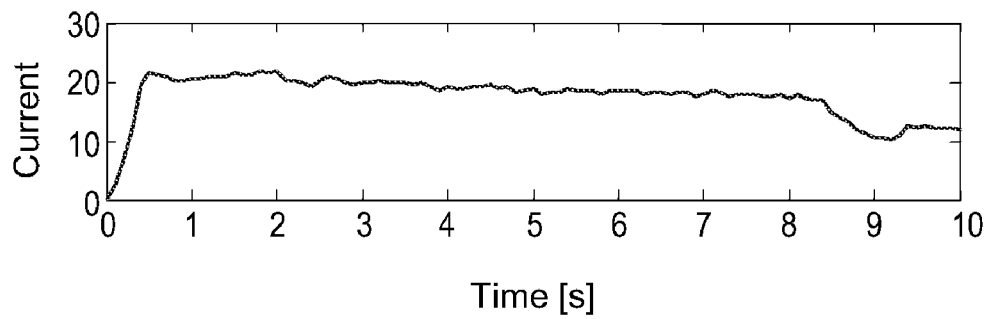
FIGS. 5A, 5B, 5C graphically illustrate exemplary sample measurements of a data window from sensor data during a flap extension.
Figure 5B:
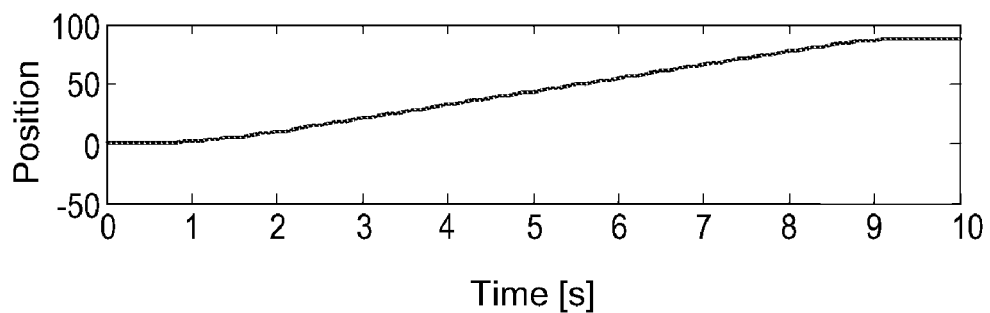
Figure 5C:
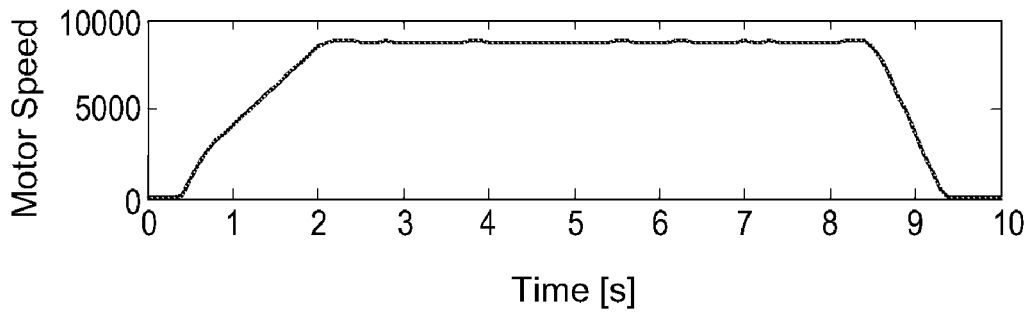

FIGS. 5A, 5B and 5C show exemplary illustrative non-limiting graphics illustrating sample measurements (current, position and speed with respect to time) of a data window from sensor data during flap extension in the FIG. 3 system. Since the system presents closed loop control for speed and position, motor speed and surface position measurements are generally not good indicators for system degradation leading to increased friction or low efficiency. The control law or algorithm implemented by controller 108 compensates for some amount of degradation and disturbances, keeping the system working according to the required performance. However, since the controller 108 must compensate the increment in friction with an increment in motor output power or other characteristic, the motor current or input power are good indicators for the degradation.

In the exemplary illustrative FIG. 3 system, the controller 108 compensates the increment in friction with an increment in motor output power. This input power may be provided by a power source used by other systems in the platform. A problem can arise that in many cases only one sensor may be capable of measuring power provided by the power source, without informing what system is using it.

Figure 7:
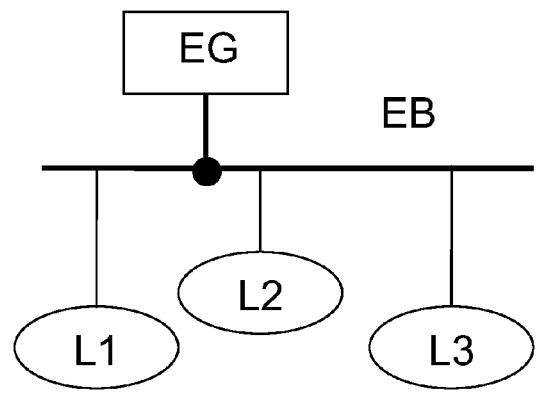
FIG. 7 shows an example non-limiting electrical architecture.

For example, FIG. 7 presents a very simplified schematic of an example electrical architecture. This example architecture comprises a three phase electrical generator (EG) that produce the electrical consumed by many systems. The generator feeds one electrical bus (EB). All loads (L1, L2 and L3) are fed through this bus. In this architecture, the motor 104 may be represented by one of the loads and the power measurement available may be only the power provided by the generator (EG) which comprises power fed to all loads (L1, L2 and L3).

In example presented above, ICA may be used to separate the power provided to each load just processing the signals from generator (EG) three phases.

Independent component analysis is a statistical technique that can be used to separate independent signals. The classical model of ICA can be formulated as:

$$X = As$$

where $x = (x1, x2, \ldots, xn)T$ is the vector of observed random variables, the vector of the independent latent variables is denoted by $s = (s1, s2, \ldots, sn)T$ and A is an unknown constant matrix, called the mixing matrix The main problem in ICA is to learn the decomposition presented in Eq(1), that is, estimate both s and A only observing the values of x. The starting point for ICA is the assumption that the components are statistically independent. The importance of this assumption is explained by the central limit theorem.

The Central Limit Theorem, a classical result in probability theory, tells that the distribution of a sum of independent random variables tends toward a gaussian distribution, under certain conditions. Thus, a sum of independent random variables usually has a distribution that is closer to gaussian than any of the original random variables.

As a consequence of the theorem, assuming that the latent variables are not gaussian, the problem of estimating A and s is turned into a problem of minimizing the similarity between a gaussian distribution and the distribution resulted from the combination of the elements of x.

Many quantitative measures of nongaussianity were proposed such as kurtosis, negentropy, negentropy approximations and others. All of them have particular advantages and disadvantages that may be analyzed according to any particular application.

Figure 8A:
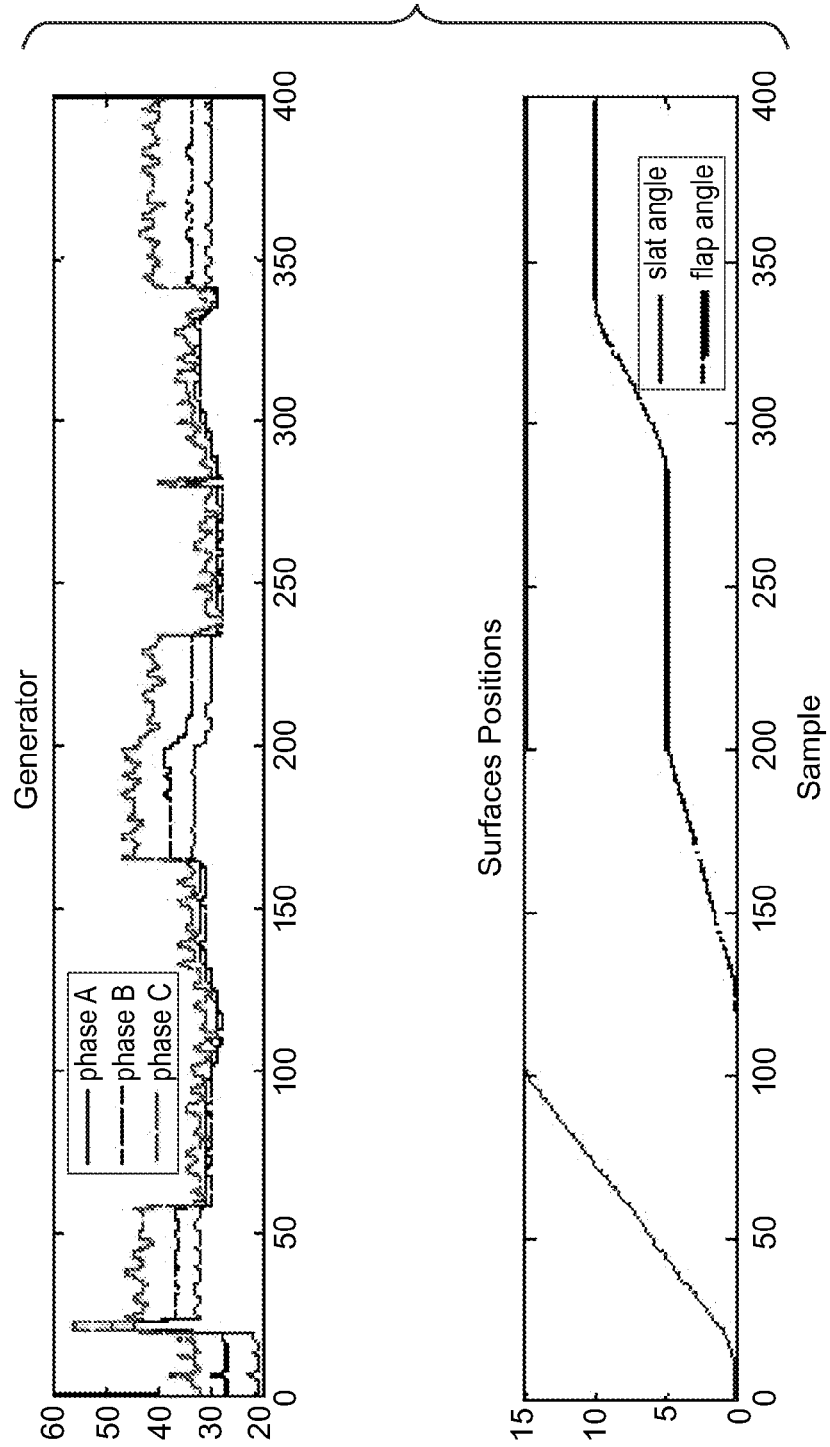
FIGS. 8A, 8B show example signals.

In the health monitoring methodology described here, the ICA algorithm may be used to separate the influences of the loads present in the signals provided by a power source. FIG. 8A presents example plots of generator currents and surfaces positions. It can be noticed that it is not straightforward to relate the raw measurements of the currents to the surfaces actuation.

Figure 8B:
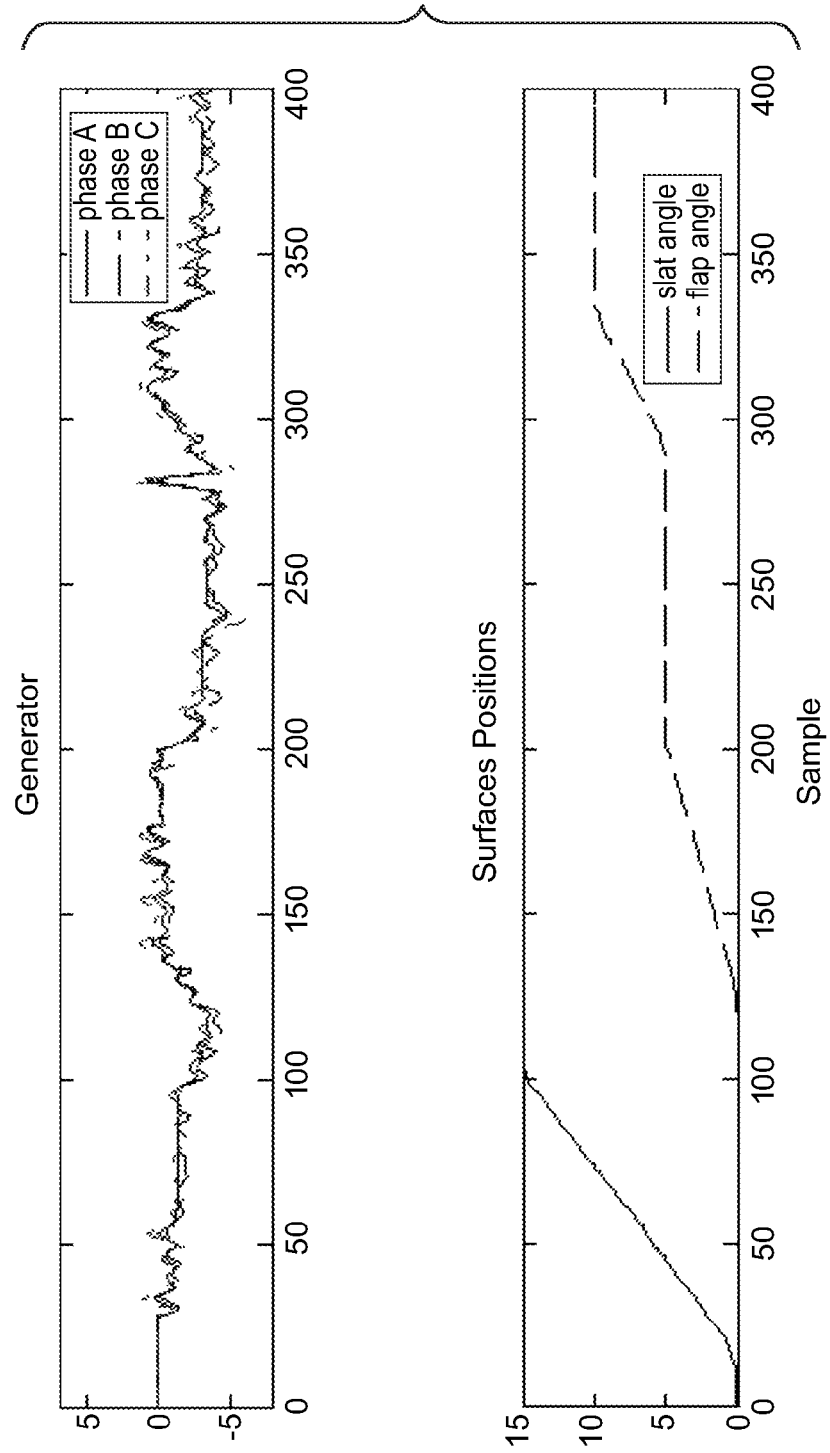

The current signal may be processed by ICA resulting in independent components that may easily be related to the load of interest. After identification of the signal related to the load of interest, the components related to other loads may be eliminated and the original currents may be reconstructed. FIG. 8B show the currents reconstructed.

Other factors besides the system degradation and other loads influence may also lead to an increment of the input power measurement. The main such factor in this preferred embodiment scenario in the FIG. 3 system is aerodynamic load. If the surface is extended for different airspeed, altitude, angle of attack or air temperature conditions, different dynamic pressures will be acting over the surfaces, which correspond to different motor powers that must be commanded by the controller. Therefore, the exemplary illustrative non-limiting implementation described herein uses sensor measurements from flap motor command currents and from dynamic pressure (or other equivalent measurements).

Various measurements from these sensors can be collected for at least one instance of a healthy system working under different operational conditions. This set of measurements of healthy instances of the system is then used by the processes described above to build a statistical model of the normal system behavior. This statistical model comprises a mathematical characterization of the statistics of the measurements and the definition of thresholds that apply to those statistics and define the limit of healthy behavior. There are various methods for building such a model and comparing new data to such model.

One method is the use of Mahalanobis distance. Generally speaking Mahalanobis distance is based on correlations between variables by which different patterns can be identified and analyzed. It is a useful way of determining similarity of an unknown sample set to a known one. See Mahalanobis, P C (1936). "On the generalized distance in statistics". Proceedings of the National Institute of Sciences of India 2 (1): 49-55. In this case, the "X matrix" referred to in FIG. 2A block 302 represents the set of sensor measurements of the health instances of the system collected at various instants of time and different normal operational conditions. The X matrix may be an n×k matrix with a general form of:

$$X = \begin{bmatrix} x_{11} & x_{12} & \ldots & x_{1k} \\ x_{21} & x_{22} & \ldots & x_{2k} \\ \vdots & \vdots & \ddots & \vdots \\ x_{n1} & x_{n2} & \ldots & x_{nk} \end{bmatrix}$$

where k is the number of different types of measurements (e.g. different sensors) and n is the number of measurements collected for each type of measurement. For the specific embodiment described, the X matrix may take the form:

$$X_1 = \begin{bmatrix} x_{11} & x_{12} \\ x_{21} & x_{22} \\ \vdots & \vdots \\ x_{n1} & x_{n2} \end{bmatrix}$$

where one column contains the measurements of command current and the other contains the measurements of dynamic pressure or equivalent. The measurements may be the average values for command current and dynamic pressure for a certain data window for each flight.

In order to use the Mahalanobis distance, the real mean ($\mu$) and covariance matrix ($\Sigma$) of the distribution of the variables considered to build X are known a priori and these values form the statistical model. The thresholds that define normal behavior are defined based on a chi square probability density function (pdf). The set of values of $\mu$, $\Sigma$ and thresholds define the statistical model in this case. Once this model is built, it can be used to define if new measurements present normal behavior according to the process presented on FIG. 2B. Xnew is the new measurements vector, which takes the general form:

$$X_{new} = [x_{11} \; x_{12} \ldots x_{1k}]$$

where each value is a new measurement for a different type of measurement. For the specific embodiment described, the Xnew vector would take the form:

$$X_{new1} = [x_{11} x_{12}]$$

where one value is the new measurement of command current and the other is the new measurement of dynamic pressure or equivalent. The Mahalanobis distance for each new measurement would then take the following general form:

$$D_M = (X_{new} - \mu)\Sigma^{-1}(X_{new} - \mu)^T$$

This Mahalanobis distance may represent the "degradation index" for the system under consideration.

Figure 9:
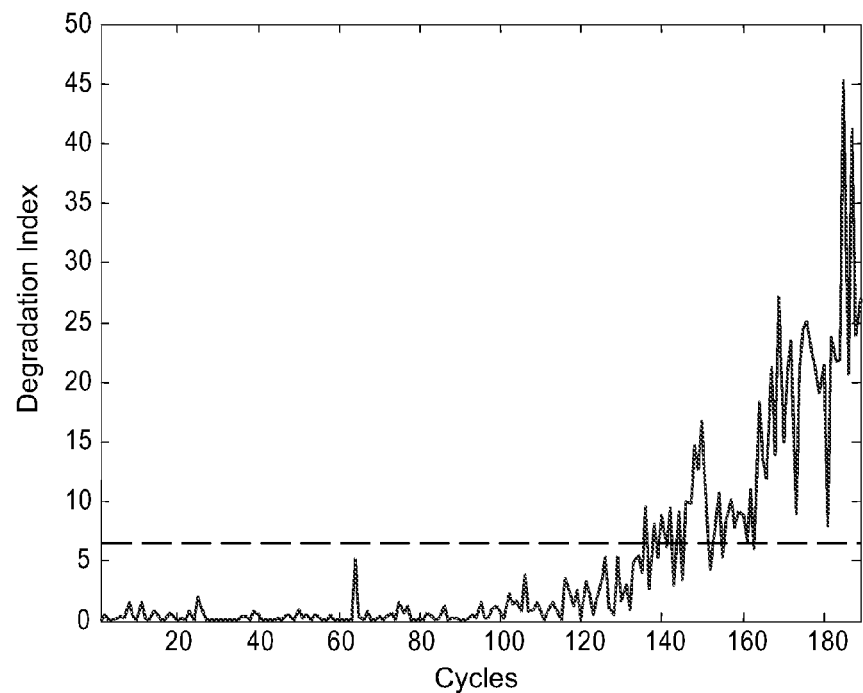
FIG. 9 shows an exemplary illustrative non-limiting sample evolution of a degradation index with a corresponding threshold.

FIG. 9 graphically illustrates an exemplary illustrative non-limiting sample evolution of a "degradation index" with a corresponding threshold. As can be seen, the degradation index remains low in this example for the first 100+ cycles of operation but begins to rise with further cycles—indicating that the system's operation is being degraded.

Another way of building the statistical model and calculating the degradation index would be using Hotelling's T2. See e.g., H. Hotelling, "Analysis of a complex of statistical variables into principal components", Journal of Educational Psychology, 24, 498-520 (1933). In this case, there is no need to know the values for $\mu$ and $\Sigma$ a priori. Instead, the values for the mean and covariance matrix are estimated from the measurements. In this case, instead of $\mu$ and $\Sigma$, the values will be represented respectively by m and S. The value of the m vector can be calculated using the following equation:

$$m = \left[ \frac{1}{n}\sum_{i=1}^{n} x_{i1} \quad \frac{1}{n}\sum_{i=1}^{n} x_{i2} \quad \ldots \quad \frac{1}{n}\sum_{i=1}^{n} x_{ik} \right]$$

where the terms xij, i=1, 2, . . . , n and j=1, 2, . . . , k, are obtained from the X matrix. The value of the S matrix can be calculated using the following equation:

$$S = \frac{1}{n-1} \sum_{i=1}^{n} [(X_i - m)^T (X_i - m)]$$

where Xi, i=1, 2, . . . , n are the lines of the X matrix. In this case, for each new measurement, the degradation index takes the form:

$$D_H = (X_{new} - m) S^{-1} (X_{new} - m)^T$$

The thresholds can be calculated using the following equation:

$$t_H = \frac{(n-1)(n+1)k}{n(n-k)} F_\alpha(k, n-k)$$

where $F\alpha(k, n-k)$ stands for the F distribution pdf with confidence level $\alpha$ and degrees of freedom k and (n−k).

When some of the measured variables are not associated to the system degradation, such as the dynamic pressure in the presented preferred embodiment, Runger U2 may be used for the calculation of a degradation index that is more sensitive to the degradation. See e.g., G. C. Runger. "Projections and the U2 multivariate control chart", Journal of Quality Technology, 28, 313-319 (1996). This degradation index can be calculated using the following equation:

$$D_R = D_H - (\hat{X}_{new} - \hat{m}) \hat{S}^{-1} (\hat{X}_{new} - \hat{m})^T$$

where $\hat{X}_{new}$ includes only the subset of variables of Xnew which are not related to the degradation. $\hat{m}$ and $\hat{S}$ are calculated using the same subset of variables for the X matrix.

Yet another way to build the statistical model and calculate the degradation index may use the multi-way principal component analysis (PCA). In this case, instead of considering the average value of the measured values along a data window or other way to transform the data window measurements into a single value for each variable, all data points for a certain data window may be considered. This is done by using an alternative form for the X matrix:

$$X_i = [x_1(t_0) \, x_1(t_1) \ldots x_1(t_f) \, x_2(t_0) \, x_2(t_2) \ldots x_2(t_f) \ldots x_k(t_0) \ldots x_k(t_f)]$$

where Xi, i=1, 2, . . . , n, are the lines of the new X matrix, t0, t1, . . . tf are the measurement instants of the time window when the measurements are performed and xi, i=1, 2, . . . , k, are the considered variables.

In this case, since the X matrix will contain a great number of highly correlated columns, it is necessary to perform a PCA transformation and retain only a few principal components to perform the calculations. The method of building the X matrix this way and performing PCA is called multi-way PCA. After the definition of the principal components that will be retained, Hotelling's T2 may be used to calculate the degradation index.

All these statistical degradation indexes calculated using the mentioned techniques may not be adequate for directly describing the system health state. This is because statistically some points may exceed a threshold even for a healthy equipment. To overcome this limitation, the present solution may also include the calculation of more elaborate health indicators based on these indexes. One such indicator could be calculated using a moving window over the statistical index calculation results. For instance, if a 95% threshold is being used, a 20 data point moving window could be considered and the number of threshold exceedances along the window define the health index. In this non-limiting illustrative example, for each new statistical index calculation (such as Mahalanobis distance, Hotteling's T2, Runger U2 or other) the previous 19 calculated results are retrieved and the number of threshold exceeding occurrences among the 20 resulting points is counted. If no exceeding occurs or one single exceeding occurs, there is no degradation. If more than one exceeding event occurs, the degradation can be defined in proportion to the number of such exceedances.

Besides indicating the health of the system or component, the exemplary illustrative non-limiting implementation may also provide the prognostics of the future health of the system or component. The FIG. 6 exemplary illustrative non-limiting process can be used to perform such prognostics functionality. This is accomplished by combining the new calculated degradation index (using any of the described methods) (block 402), and comparing these new measurements with other previously calculated values (block 406). This set of new and historical values is used to identify a trend in system degradation (block 408). This trend is then extrapolated so that the future time when the degradation index will reach a threshold can be estimated (block 410). The difference between the instant of the latest measurement considered for the calculations and the estimated instant when the degradation index will reach a threshold is the RUL. The estimated instant when the degradation will reach a threshold or the RUL are then provided as outputs together with confidence bounds (block 412). These confidence bounds may be provided in terms of lower and upper limits or as a pdf.

Example Database Use and Manipulation

The various methods described are based on data measured by sensors onboard an aircraft in the described preferred embodiment. The processing arrangement shown in FIG. 11 describes an exemplary illustrative non-limiting process of getting the sensor data from on board the aircraft and its insertion at a database. Data pre-processed onboard the aircraft may also be included on the transmission. First, the airplane arrives at the airport and the sensor information is transferred to the processing station. These transferring processes can be either manual or automatic. This data is inserted at a database located at a ground station. This process may repeat at each aircraft landing or any other desired times.

Figure 11:
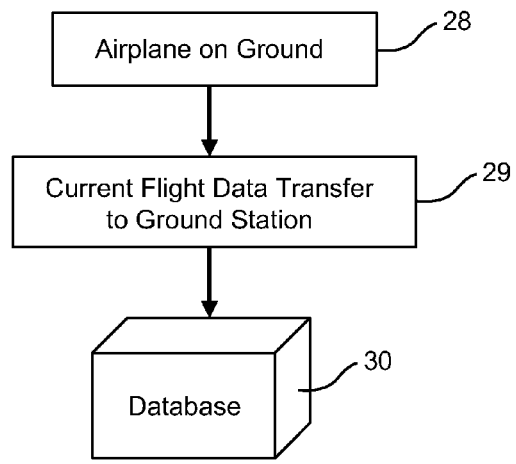
FIG. 11 is a flowchart of an exemplary illustrative non-limiting process for collecting and sending data to a ground station.
Figure 12:
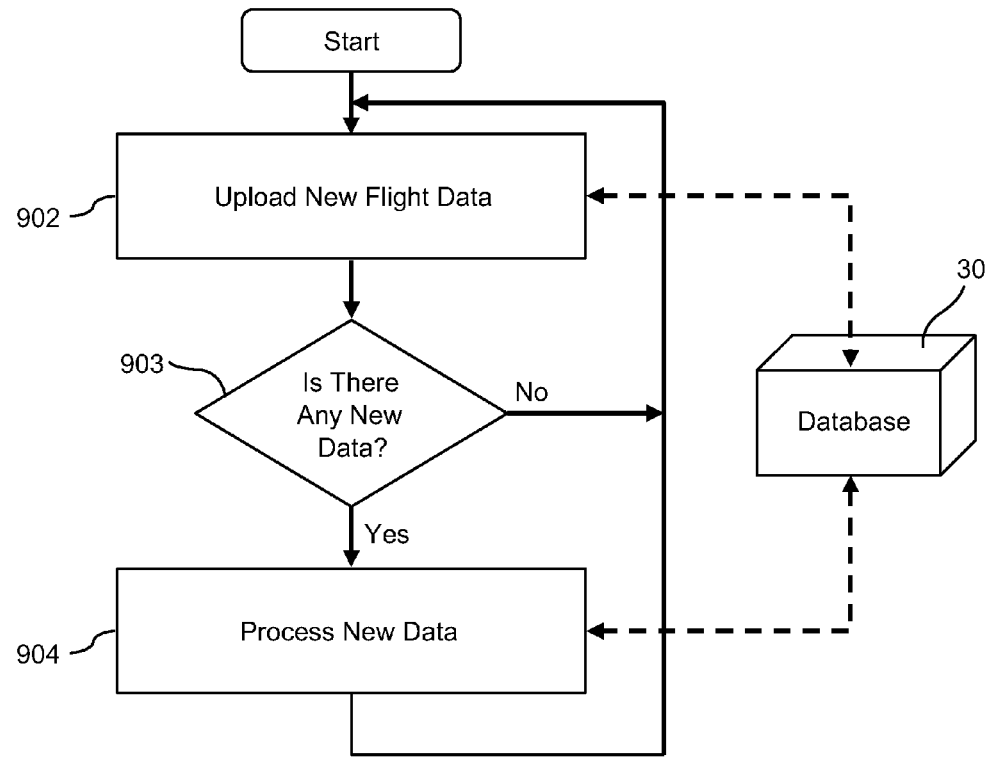
FIG. 12 is a flowchart of an exemplary illustrative non-limiting process for analyzing information collected in a database.

The exemplary illustrative processing arrangement shown in FIG. 12 describes the process of manipulating the sensors data from the database which is the same as in FIG. 11. This process can be independent from the one presented on FIG. 11 and can run continuously. The first step is to check if any new sensor data was inserted at the database. If not, the process enters a loop until any inserted data is found. When data upload to the database is detected, the new uploaded data is processed according to the process described on FIG. 11. Since this process is being presented for the health monitoring, it is considered that the statistical models have been previously calculated according to the described methods and stored in the database. Therefore, the data processing generates the state of health of the said system. These results are stored in the database and process goes back to the data checking.

Figure 13:
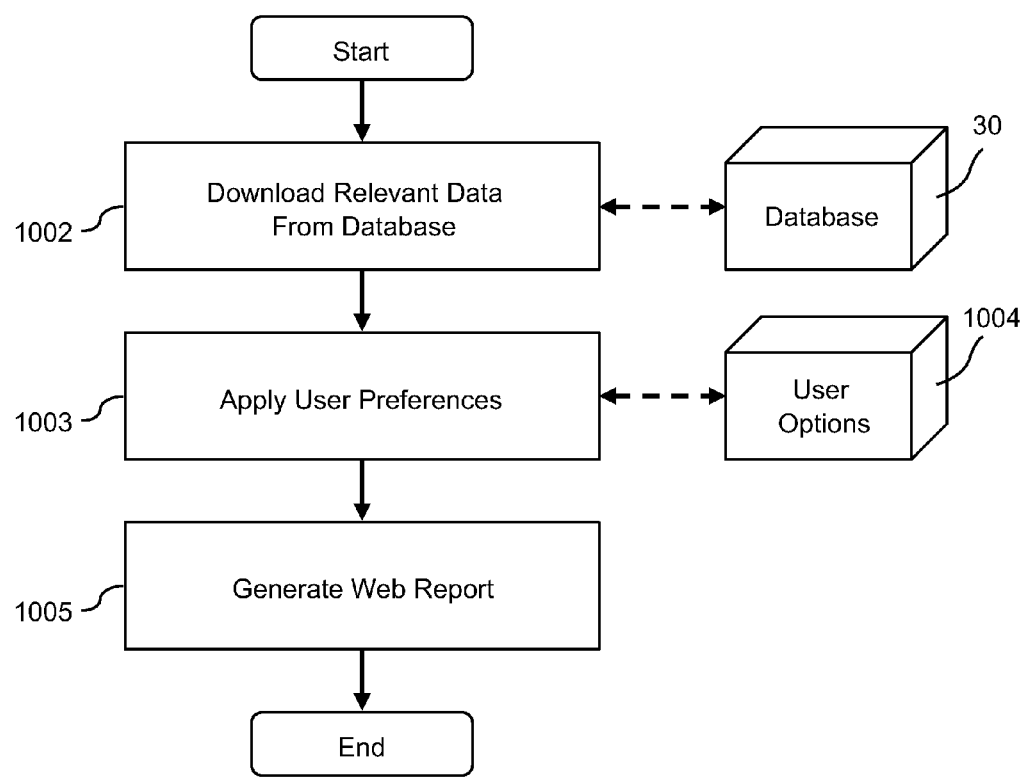
FIG. 13 is an exemplary illustrative non-limiting process flowchart for reporting degradation analysis results.

The processing arrangement shown in FIG. 13 describes the process of presentation to the final user. This process can be independent of the others and it may run only when the user interface is accessed. The first step downloads the relevant data from the database which is the same as databases in FIGS. 11 & 12. Then, the process applies user preferences for alerts configuration. These preferences consist of parameters provided by the user which can be edited and stored at the database. The results may be presented in a report generated at a display or other visual, aural or tactile indication. This report may be web based.

Each of the documents cited above is incorporated herein by reference.

While the technology herein has been described in connection with exemplary illustrative non-limiting implementations, the invention is not to be limited by the disclosure. While particular methods of calculating degradation index have been presented herein, other predictive, statistical or other analysis can be used. While the exemplary illustrative embodiments provide techniques for predicting degradation in aircraft based systems, the techniques herein can be used in connection with any electro-mechanical or other system used for any industrial or other application. The invention is intended to be defined by the claims and to cover all corresponding and equivalent arrangements whether or not specifically disclosed herein.

We claim:

1. A method of monitoring the health state of an electro-mechanical system or component, said system or component being controlled in a closed loop control system, said method being performed automatically by at least one processor, the method comprising:
    collecting measurements of at least one measurable varying parameter from healthy instances of said system or component while it is being commanded for a predetermined pattern of operation under known operational conditions;
    with the at least one processor, constructing a statistical model at least in part in response to said collected measurements;
    collecting new measurements for at least one instance of the system or component while it is being commanded for the same or similar predetermined pattern of operation;
    with the at least one processor, comparing said new measurements to said statistical model and in response thereto, producing a quantitative degradation index for said at least one instance of said system or component; and
    with the at least one processor, generating an indication whenever said degradation index exceeds a threshold,
    further including calculating, with the at least one processor, said degradation index using more than one technique and combining results of said more than one technique to provide the quantitative degradation index.

2. The method of claim 1 wherein said collecting measurements includes collecting at least one measurement associated with electrical input power.

3. The method of claim 1 wherein said collecting measurements includes measuring electrical input power to at least one motor.

4. The method of claim 1 wherein said collecting measurements includes measuring at least one position indication.

5. The method of claim 1 wherein said collecting measurements includes measuring at least one speed indication.

6. The method of claim 1 wherein said collecting measurements includes measuring at least one parameter related to operational condition.

7. The method of claim 1 wherein said collecting measurements includes measuring at least one parameter related to disturbances.

8. The method of claim 1 wherein said collecting measurements include measurements obtained indirectly using blind source separation techniques.

9. The method of claim 8 wherein said blind source separation technique is Independent Component Analysis (ICA).

10. The method of claim 1 wherein said predetermined pattern of operation is a fixed pattern in consequence of said system or component normal operation.

11. The method of claim 1 wherein said predetermined pattern of operation is a fixed pattern in consequence of at least one test performed on said system or component.

12. The method of claim 1 wherein said system or component comprises an aircraft flap system.

13. The method of claim 1 wherein said system or component comprises an aircraft slat system.

14. The method of claim 1 wherein said system or component comprises an electro-mechanical actuator.

15. The method of claim 1 further including calculating said degradation index using Mahalanobis distance.

16. The method of claim 1 further including calculating said degradation index using Hotelling's T-square.

17. The method of claim 1 further including calculating said degradation index using multi-way principal component analysis ("PCA").

18. The method of claim 1 further including calculating complex degradation indicators based on the statistical model.

19. A method of monitoring the health state of an electro-mechanical system or component, said system or component being controlled in a closed loop control system, said method being performed automatically by at least one processor, the method comprising:
    collecting measurements of at least one measurable varying parameter from healthy instances of said system or component while it is being commanded for a predetermined pattern of operation under known operational conditions;
    with the at least one processor, constructing a statistical model at least in part in response to said collected measurements;
    collecting new measurements for at least one instance of the system or component while it is being commanded for the same or similar predetermined pattern of operation;
    with the at least one processor, comparing said new measurements to said statistical model and in response thereto, producing a quantitative degradation index for said at least one instance of said system or component; and
    with the at least one processor, generating an indication whenever said degradation index exceeds a threshold,
    further including calculating said degradation index using Runger U2.

20. A system for monitoring the health state of an electro-mechanical system or component, said system or component being controlled in a closed loop control system, said system comprising:
    means for collecting measurements of at least one measurable varying parameter from healthy instances of said system or component while it is being commanded for a predetermined pattern of operation under known operational conditions;

means for constructing a statistical model at least in part in response to said collected measurements;

means for collecting new measurements for at least one instance of the system or component while it is being commanded for the same or similar predetermined pattern of operation;

means for comparing said new measurements to said statistical model and in response thereto, producing a quantitative degradation index for said at least one instance of said system or component;

means for generating an indication whenever said degradation index exceeds a threshold; and means for calculating said degradation index using more than one technique and means for combining results of said more than one technique to provide a degradation index.

21. The system of claim 20 wherein said collecting means comprises means for collecting at least one measurement associated with electrical input power.

22. The system of claim 20 wherein said collecting means comprises means for measuring electrical input power to at least one motor.

23. The system of claim 20 wherein said collecting means comprises means for measuring at least one position indication.

24. The system of claim 20 wherein said collecting measurements includes measuring at least one speed indication.

25. The system of claim 20 wherein said collecting means comprises means for measuring at least one parameter related to operational condition.

26. The system of claim 20 wherein said collecting means comprises means for measuring at least one parameter related to disturbances.

27. The system of claim 20 wherein said predetermined pattern of operation is a fixed pattern in consequence of said system or component normal operation.

28. The system of claim 20 wherein said predetermined pattern of operation is a fixed pattern in consequence of at least one test performed on said system or component.

29. The system of claim 20 wherein said system or component comprises an aircraft flap system.

30. The system of claim 20 wherein said system or component comprises an aircraft slat system.

31. The system of claim 20 wherein said system or component comprises an electro-mechanical actuator.

32. The system of claim 20 further including means for calculating said degradation index using Mahalanobis distance.

33. The system of claim 20 further including means for calculating said degradation index using Hotelling's T-square.

34. The system of claim 20 further including means for calculating said degradation index using multi-way principal component analysis ("PCA").

35. A system for monitoring the health state of an electro-mechanical system or component, said system or component being controlled in a closed loop control system, said system comprising:

means for collecting measurements of at least one measurable varying parameter from healthy instances of said system or component while it is being commanded for a predetermined pattern of operation under known operational conditions;

means for constructing a statistical model at least in part in response to said collected measurements;

means for collecting new measurements for at least one instance of the system or component while it is being commanded for the same or similar predetermined pattern of operation;

means for comparing said new measurements to said statistical model and in response thereto, producing a quantitative degradation index for said at least one instance of said system or component;

means for generating an indication whenever said degradation index exceeds a threshold; and means for calculating said degradation index using Runger U2.

36. A method of predicting future health states of an electro-mechanical system or component, said system or component being controlled in a closed loop fashion, said method being performed automatically with at least one processor, the method comprising:

collecting measurements of at least one measurable varying parameter from healthy instances of said system or component while said system is being commanded in response to a predetermined pattern of operation under at least some normal operational conditions;

with the at least one processor, using said collected measurements for building a statistical model of said system or process;

collecting new measurements of the same at least one measurable varying parameter for at least one instance of the system or component which is to be monitored while it is being commanded in response to said predetermined pattern of operation;

with the at least one processor, comparing said collected new measurements to said statistical model and producing a quantitative degradation index for each said system or component instance;

with the at least one processor, using specific historical data of the quantitative degradation index for each said system or component instance together with new calculated values of the quantitative degradation index to identify at least one trend in a state of said quantitative degradation index for each said system or component instance;

with the at least one processor, extrapolating said at least one trend to identify at least one expected future instant when said quantitative degradation index for each said system or component instance will reach a defined threshold;

with the at least one processor, defining confidence bounds for said expected future instant when said quantitative degradation index for each said instance will reach a predefined threshold;

with the at least one processor, generating outputs indicating said expected future instant when said quantitative degradation index for each said instance will reach a defined threshold and said confidence bounds; and with the at least one processor, calculating said degradation index using more than one method and combining the results to provide a final degradation index.

37. The method of claim 36 wherein said confidence bounds comprise a probability density function.

38. The method of claim 36 wherein said confidence bounds provide upper and lower limits.

39. The method of claim 36 wherein said measurements include at least one measurement associated with electrical input power.

40. The method of claim 39 wherein said measurement associated with electrical input power is electrical command current to the motors.

41. The method of claim 36 wherein said measurements include at least one position indication.

42. The method of claim 36 wherein said measurements include at least one speed indication.

43. The method of claim 36 wherein said measurements include at least one parameter related to the operational conditions.

44. The method of claim 36 wherein said measurements include at least one parameter related to disturbances.

45. The method of claim 36 wherein said predetermined pattern of operation is a consequence of said system or component normal operation.

46. The method of claim 36 wherein said predetermined pattern of operation is a consequence of at least one test performed on said system or component.

47. The method of claim 36 wherein said system or component comprises an aircraft flap system.

48. The method of claim 36 wherein said system or component comprises an aircraft slat system.

49. The method of claim 36 wherein said system or component comprises an aircraft horizontal stabilizer system.

50. The method of claim 36 wherein said system or component comprises an electro-mechanical actuator.

51. The method of claim 36 further including calculating said degradation index using Mahalanobis distance.

52. The method of claim 36 further including calculating said degradation index using Hotelling's T-square.

53. The method of claim 36 further including building a statistical model using multi-way principal component analysis ("PCA").

54. A method of predicting future health states of an electro-mechanical system or component, said system or component being controlled in a closed loop fashion, said method being performed automatically with at least one processor, the method comprising:
    collecting measurements of at least one measurable varying parameter from healthy instances of said system or component while said system is being commanded in response to a predetermined pattern of operation under at least some normal operational conditions;
    with the at least one processor, using said collected measurements for building a statistical model of said system or process;
    collecting new measurements of the same at least one measurable varying parameter for at least one instance of the system or component which is to be monitored while it is being commanded in response to said predetermined pattern of operation;
    with the at least one processor, comparing said collected new measurements to said statistical model and producing a quantitative degradation index for each said system or component instance;
    with the at least one processor, using specific historical data of the quantitative degradation index for each said system or component instance together with new calculated values of the quantitative degradation index to identify at least one trend in a state of said quantitative degradation index for each said system or component instance; and
    with the at least one processor, extrapolating said at least one trend to identify at least one expected future instant when said quantitative degradation index for each said system or component instance will reach a defined threshold;
    further including calculating said degradation index using Runger U2.

55. A system for predicting future health states of an electro-mechanical system or component, said system or component being controlled in a closed loop fashion, said system comprising:
    means for collecting measurements of at least one measurable varying parameter from healthy instances of said system or component while said system is being commanded in response to a predetermined pattern of operation under at least some normal operational conditions;
    means for using said collected measurements for building a statistical model of said system or process;
    means for collecting new measurements of the same at least one measurable varying parameter for at least one instance of the system or component which is to be monitored while it is being commanded in response to said predetermined pattern of operation;
    means for comparing said collected new measurements to said statistical model and producing a quantitative degradation index for each said system or component instance;
    means for using specific historical data of the degradation index for each said system or component instance together with new calculated degradation index values to identify at least one trend in said system or component instance degradation state;
    means for extrapolating said at least one trend to identify at least one expected future instant when said quantitative degradation index for each said instance will reach a defined threshold;
    means for defining confidence bounds for said instant when said quantitative indicator of degradation for each said instance will reach a predefined threshold; and
    means for generating outputs indicating said expected instant in the future when said quantitative indicator of degradation for each said instance will reach a defined threshold and said confidence bounds,
    further including means for calculating said degradation index using more than one method and means for combining the results to provide a final degradation index.

56. The system of claim 55 wherein said confidence bounds comprise a probability density function.

57. The system of claim 55 wherein said confidence bounds provide upper and lower limits.

58. The system of claim 55 wherein said measurements include at least one measurement associated with electrical input power.

59. The system of claim 55 wherein said measurement associated with electrical input power is electrical command current to the motors.

60. The system of claim 55 wherein said measurements include at least one position indication.

61. The system of claim 55 wherein said measurements include at least one speed indication.

62. The system of claim 55 wherein said measurements include at least one parameter related to the operational conditions.

63. The system of claim 55 wherein said measurements include at least one parameter related to disturbances.

64. The system of claim 55 wherein said predetermined pattern of operation is a consequence of said system or component normal operation.

65. The system of claim 55 wherein said predetermined pattern of operation is a consequence of at least one test performed on said system or component.

66. The system of claim 55 wherein said system or component comprises an aircraft flap system.

67. The system of claim 55 wherein said system or component comprises an aircraft slat system.

68. The system of claim 55 wherein said system or component comprises an electro-mechanical actuator.

69. The system of claim 55 further including means for calculating said degradation index using Mahalanobis distance.

70. The system of claim 55 further including means for calculating said degradation index using Hotelling's T-square distribution.

71. The system of claim 55 further including means for building a statistical model using multi-way principal component analysis ("PCA").

72. A system for predicting future health states of an electro-mechanical system or component, said system or component being controlled in a closed loop fashion, said system comprising:

means for collecting measurements of at least one measurable varying parameter from healthy instances of said system or component while said system is being commanded in response to a predetermined pattern of operation under at least some normal operational conditions;

means for using said collected measurements for building a statistical model of said system or process;

means for collecting new measurements of the same at least one measurable varying parameter for at least one instance of the system or component which is to be monitored while it is being commanded in response to said predetermined pattern of operation;

means for comparing said collected new measurements to said statistical model and producing a quantitative degradation index for each said system or component instance;

means for using specific historical data of the degradation index for each said system or component instance together with new calculated degradation index values to identify at least one trend in said system or component instance degradation state;

means for extrapolating said at least one trend to identify at least one expected future instant when said quantitative degradation index for each said instance will reach a defined threshold;

means for defining confidence bounds for said instant when said quantitative indicator of degradation for each said instance will reach a predefined threshold; and means for generating outputs indicating said expected instant in the future when said quantitative indicator of degradation for each said instance will reach a defined threshold and said confidence bounds, further including means for calculating said degradation index using Runger U2.

73. A method for predicting degradation of a closed loop control system on board an aircraft comprising:

(a) operating a closed loop aircraft control surface control system in response to at least one predetermined pattern;

(b) collecting control output data during step (a);

(c) with at least one processor, automatically constructing a statistical model at least in part in response to said data collected by step (b);

(d) later repeating steps (a) and (b) to collect additional data;

(e) with the at least one processor, automatically deriving a degradation index in response to said additional data and said statistical model by calculating at least one distance indicating correlations between variables to identify and analyze patterns and generating output data responsive thereto; and (f) with the at least one processor, automatically generating, in response to the generated output data, at least one alert perceivable by a human at least in part in response to the degradation index exceeding a predetermined threshold.

* * * * *